Patented Feb. 2, 1937

2,069,725

UNITED STATES PATENT OFFICE 2,069,725

DRYING OIL COMPOSITION AND PROCESS OF MAKING SAME

John B. Rust, Orange, N. J., assignor to Ellis-Foster Company, a corporation of New Jersey No Drawing. Application March 9, 1935, Serial No. 10,249

8 Claims. (Cl. 134—26)

The present invention relates to compositions comprising the reaction products and solutions of fatty oils and a synthetic resin of the type obtained by condensing a polyhydroxybenzene and a ketone.

It is an object of this invention to provide compositions of a siccative type from a drying oil and a condensation product of a polyhydroxybenzene and a ketone.

The condensation products of polyhydroxybenzenes and ketones in the presence of an acid catalyst are, if the conditions are properly adjusted, resinous in character. Such resins, in general, are characterized by their lightness in color, stability toward light and oxygen or air, fusibility and solubility in fatty oils. Furthermore, such resins may be heated at elevated temperatures for long periods of time with no undue darkening or hardening beyond their initial color and hardness.

The condensation products of ketones and polyhydroxybenzenes range from colored syrups to light, hard, brittle resins. In general I prefer to use the pale resins in my compositions, but I do not preclude the use of any condensation product which is a syrup or resin. The type of condensation product obtained depends upon the proportion of reactants, the type of catalyst and the stage to which the reaction is allowed to proceed. For instance, colored syrups usually result when less than two moles of acetone are reacted with one mole of resorcinol. The same colored products result when the reaction of two or more moles of acetone with one mole of resorcinol is arrested before it is complete, or when a weak acid or no condensing agent is used. Pale-colored resins are produced when two or more moles of acetone are reacted with one mole of resorcinol in the presence of a small amount of a strong mineral acid and the reaction is allowed to proceed to completion as can be detected by rise of the reflux temperature to 100° C. The above is true of acetone and resorcinol but it is also true, with slight modification, of other ketones and polyhydroxybenzenes. Among the polyhydroxybenzenes which may be used are resorcinol, pyrogallol, orcinol and catechol. The ketones which may be used are acetone, methyl ethyl ketone, cyclohexanone, methylcyclohexanone, mesityl oxide, phorone, acetophenone, and the like.

Some ketones yield dark-colored products when reacted with a polyhydroxybenzene. For instance, benzophenone and orcinol when heated together in the presence of sulphuric acid give a very viscous red liquid which is soluble in fatty oils. When stearone and resorcinol are heated with sulphuric acid a red wax-like solid is produced which is readily soluble in drying oils and other fatty oils.

The compositions comprehended by this invention may be used as varnishes, lacquers, or may be ground with pigments to serve as paints and enamels. Films of the compositions are in general water-white, and quite thick films may be built up without undue color being noticed. This property makes them especially useful in the manufacture of oiled and impregnated fabric. Colors and dyes may be incorporated and the original color or tint retained when the films have dried. The compositions may be used as electrical insulation and are especially useful when decorative insulation is required. Furthermore, varnish compositions made from a drying oil such as tung, oiticica, or linseed oil have the property of rapid drying and freedom from discoloration by light or exposure. The dried films are resistant to water and acids for indefinite periods. They are not attacked or softened by gasoline or petroleum solvents and have great resistance to alkalies.

I have found that condensation products of ketones and polyhydroxybenzenes wholly or partially react with or dissolve in all of the vegetable and animal oils, or oil acids. The resinous constituent of the compositions herein described may consist entirely of a polyhydroxybenzene-ketone resin or I may add rosin, ester gum, or the various natural resins and resin esters at any stage in the preparation of my compositions as adulterants.

The resins described below are illustrative of the resinous ingredients used in the compositions of this invention.

A. 150 grams resorcinol
150 grams acetone
5 grams 35% aqueous hydrochloric acid

The constituents were dissolved and the solution heated to boiling under a reflux for two hours. In twenty minutes a thick syrupy liquid formed which clouded in about 45 minutes, due to the water split off during condensation. This cloudy viscous material slowly increased in viscosity until in 2 hours the reflux temperature was about 100° C. and all of the acetone had reacted. This product when cooled to room temperature was hard, brittle and opaque. It was heated in an open beaker to remove the water and the temperature was slowly raised to 180° C. During this process there is local overheating, but since the resin is permanently fusible no polymerization or discoloration takes place. The final product at room temperature is a very pale yellow, hard, brittle, odorless resin.

B. 50 grams pyrogallic acid
   50 grams acetone
   1 gram 35% aqueous hydrochloric acid Prepared in the same manner as resin A.

C. 26 grams resorcinol
   50 grams methylcyclohexanone
   3 grams 35% aqueous hydrochloric acid Mixed and heated in an open beaker at 105° C. for 15 minutes, then at 170–180° C. until the green-blue color had changed to a pale golden-tan. The final resin at room temperature was hard and brittle.

D. 80 grams mesityl oxide
   40 grams resorcinol
   2.4 grams 35% aqueous hydrochloric acid Mixed and heated under reflux for about 7 hours. The product was removed to an open beaker and heated slowly to 190° C. The final product was a brown, hard, brittle resin. The resin was soluble in tung oil, linseed oil, castor oil and other oils.

If preferred, dehydration of the resins may be carried out in a vacuum oven. Furthermore, the resins containing water, in the form of opaque, brittle materials, may be used, the dehydration taking place while making the fatty oil-resin compositions.

I have found that only small, catalytic amounts of acid condensing agents need be employed in making these resins. Although larger amounts, for instance, 2 parts by weight acetone to 1 part by weight of hydrochloric acid, may be used, such quantities are entirely unnecessary. If pressure and higher temperatures are used, it is not necessary to use a condensing agent. Furthermore, resins similar in physical and chemical properties to resin A can be obtained when larger proportions of acetone are used. This also, however, is unnecessary. I prefer to use proportions of about 1 mole polyhydroxybenzene to slightly over 2 moles of ketone. Such resins are very pale in color and may be made into light-colored fatty oil-resin compositions.

The following are examples illustrative of the type of composition and methods of preparation comprehended by this invention. The examples are not to be construed as limiting in any way, but only in the light of illustrations.

Example 1

30 grams of raw China-wood oil
15 grams of the resin A

The oil and resin are heated slowly up to 270° C. When molten (about 110° C.) the resin dissolves completely in the tung oil with a slight darkening of the oil. As heating proceeds a reaction takes place and the color lightens until it regains the original color of the raw oil. The temperature is held at 270° C. until bodying of the composition has been effected by polymerization of the oil (about 10–12 minutes). At room temperature this siccative base is short, almost brittle. It has a very light color and is readily soluble in varnish thinners.

The above varnish base may be thinned with V. M. & P. naphtha and suitable amounts of lead and cobalt driers added. A film of such a varnish dries dust-free in 1 hour and is completely dry in 3 to 4 hours.

One objection to most synthetic resin varnishes is their yellowing during drying and on exposure to light. The above described varnish is free from such faults. It dries to a water-white, or very pale-colored film, which does not yellow on aging. When exposed to light, no yellowing occurs, but rather, it further bleaches to a perfectly water-white film.

Example 2

15 grams of raw linseed oil
15 grams of resin A

These are incorporated and heated slowly up to 290° C. The resin is immediately soluble in the oil when molten, accompanied by a darkening in color. As heating proceeds at about 260°–290° C. the color becomes lighter, due possibly to reaction, until at the end of about 15 minutes the color has returned to normal, or somewhat lighter than the original oil. At room temperature this varnish base is a soft, sticky solid.

The oil-resin composition may be held at 290° C. for longer periods of time to effect bodying of the oil by polymerization, thus producing a harder base. The color of the composition remains about the same no matter the length of time it has been heated.

If thinned with petroleum naphtha or turpentine, and lead and cobalt driers are added, a varnish or paint base is produced which dries quickly to a tough, pale film showing no tendency to yellow on aging, or to discolor when exposed to sunlight.

Example 3

10 grams raw tung oil
10 grams raw linseed oil
10 grams resin A

The components are mixed together and heated slowly up to 280° C. At first there is a slight darkening which subsequently lightens to the original color of the oil mixture. Heating is continued until the mixture has taken on a slight body (about 15 to 20 minutes). At room temperature the final product is a light-yellow, soft solid.

When spread on, or rolled into fabric and the fabric subsequently heated in an oven until the base has dried, a flexible light-colored oiled cloth is produced.

Example 4

20 grams soya bean oil
20 grams resin A

The constituents are mixed and subjected to the treatment outlined in Example 2.
An enamel is made by grinding 50 grams above base
50 grams V. M. & P. naphtha
25 grams titanium oxide
1/15 grams cobalt naphthenate
4/15 grams lead naphthenate in a ball mill. The enamel film dries hard and tough in less than 18 hours.

Example 5

20 grams perilla oil
10 grams resin A

The mixture of oil and resin is subjected to the treatment outlined in Example 2.

Example 6

15 grams castor oil
15 grams resin A

These constituents are mixed and heated slowly up to 280° C. When the resin becomes molten it dissolves in the oil with considerable darkening. When heated above 260° C. oil-resin composition begins to lighten until finally in 15 minutes at 280° C. it returns to its pale initial color.

This latter composition and all others described in these examples, I have found to be miscible in solution with chlorinated rubber and compatible in a dry, solvent-free film. Resin A itself is completely compatible with chlorinated rubber, producing when no plasticizer is present a water-white, hard, brittle film. The compositions described in Examples 1 to 5 inclusive give siccative compositions with chlorinated rubber, yielding tough, water-white films. The composition described in Example 6 gives a plasticizing effect.

Example 7

20 grams rape seed oil
10 grams resin C

Heated slowly up to 300° C. The color darkened at first then lightened as the heat reaction proceeded. The oil-resin composition was held at 300° C. until sufficiently light-colored and bodied.

Example 8

20 grams raw tung oil
10 grams resin B

Heated slowly up to 280° C. and held at this temperature for about 10 minutes until well bodied.

This siccative composition with suitable thinners (V. M. & P. naphtha, turpentine), and driers may be used as a rapidly drying varnish.

Example 9

50 grams raw oiticica oil
25 grams resin A

Heated together up to 270°–280° C. and held at this temperature for about 15 minutes. The oil-resin composition was then cooled to 80° C. and 75 g. of V. M. & P. naphtha added. When entirely dissolved to form a varnish, 0.13 g. of cobalt naphthenate and 0.53 g. of lead naphthenate were added. This varnish when brushed on a glass panel dried dust-free in 20 minutes and was entirely dry in 1½ hours.

A floor coated with the varnish could be used 1¾ to 2 hours after it had been brushed. This remarkably rapid drying is characteristic of all siccative compositions comprehended by this invention, the tung oil and oiticica oil compositions being the most rapid drying, requiring 1 to 2 hours to become completely dry. The dried films are tough, withstanding abrasion and stable, retaining their pale color on aging.

Resins A, B, C, and D all have the same solubility in fatty oils. Among the oils which may be used are: tung oil in any of its forms, linseed oil in any of its forms, rape seed oil, perilla oil, soya bean oil, oiticica oil, castor oil, fish oils, cottonseed oils, and the like. Furthermore, the proportion of oil to resin in the compositions may be varied. The polyhydroxybenzene-ketone resins are soluble in all proportions in fatty oils and very short oil, as well as long oil bases may be prepared.

The final color of all the compositions herein described is light. There is first a darkening in color, then as heating of the resin-oil solution proceeds a lightening sets in and the compositions return to their original color. Furthermore, this paleness of color persists and, as noted above, no discoloration takes place on aging, or exposure to light or air.

The methods described in the above examples require the use of heat to effect a combination of the fatty oil with the polyhydroxybenzene-ketone resin. In this way pale-colored varnishes are produced which are color-stable and rapid drying. These methods are the most satisfactory for producing resistant coating compositions. Many synthetic and natural resins only become miscible with or soluble in drying or fatty oils when heated with the oils at elevated temperatures, but are not miscible or compatible in the cold and in solution without preheating. However, I have found that polyhydroxybenzene-ketone condensation products are miscible with drying oils in the cold. The procedure is to dissolve the resin in a solvent, mix the solution with a fatty oil, then cut to a desired consistency with a thinner such as gasoline, V. M. & P. naphtha or turpentine.

Example 11

1 part resin A
1 part ethylene glycol monoethyl ether

Shaken together until completely dissolved. 2 parts of raw tung oil were added and stirred to form a clear solution. 3 parts of gasoline were then added with lead and cobalt naphthenate driers. The clear solution when brushed in a thin film dried dust-free in ½ hour and was entirely dry in 2 hours.

Cold-cut varnishes may be prepared in this manner with a polyhydroxybenzene-ketone resin and a drying oil. The varnishes may be incorporated with pigments or dyes and be used as stains, paints or enamels. The films dry rapidly and are clear, tough and color stable.

As noted above, clear varnish compositions comprising a base formed by the heat-treatment of a drying oil and a polyhydroxybenzene-ketone resin do not yellow or discolor on drying and aging, either in the presence or absence of light. This is also true of compositions comprising a white pigment such as titanium oxide, lithopone or zinc oxide and the resorcinol-acetone resin-drying oil varnishes described herein. Many varnishes, enamels or pigmented drying compositions containing natural or synthetic resins, yellow on drying and discolor on aging. This discoloration is more pronounced when white pigments are used and even slight yellowing produces off-color coatings. The white pigmented compositions comprehended by this invention comprising a white pigment and an initially light-colored base comprising a heat-treated mixture of a drying oil and a polyhydroxybenzene-ketone resin dry to coatings having the same shade of color as the pigment used and remain the same color upon aging for an indefinite period, either in the presence or absence of artificial or natural light.

What I claim is:

1. A drying composition comprising the heat-treated mixture of tung oil and resorcinol-acetone resin.

2. A color-stable siccative composition comprising a heat-treated mixture of resorcinol-acetone resin and a drying oil.

3. The process of forming a varnish base which consists in heating a fatty oil with resorcinol-acetone resin until said composition has sensibly lightened in color.

4. The process of forming a siccative composition which consists in heating together tung oil and resorcinol-acetone resin substantially above 200° C. until a lightening of color and bodying has taken place.

5. Composition comprising a heat-treated mixture of fatty oil and condensation product obtained from a reaction mixture consisting solely of a ketone and a polyhydroxybenzene selected from the group consisting of resorcinol, pyrogallol and orcinol, said condensation product being soluble in said fatty oil.

6. Composition comprising a co-heated mixture of drying oil and resin made from the condensation product of a mixture consisting solely of a polyhydroxybenzene and acetone.

7. Siccative composition comprising a co-heated mixture of drying oil and a condensation product obtained from a mixture consisting solely of a ketone and a polyhydroxybenzene.

8. Non-yellowing siccative composition comprising a co-heated mixture of drying oil and a condensation product obtained from a reaction mixture consisting solely of a ketone and a polyhydroxybenzene selected from the group consisting of resorcinol, orcinol and pyrogallol, and a pigment.

JOHN B. RUST.